(12) United States Patent
Doerring

(10) Patent No.: US 9,195,317 B2
(45) Date of Patent: Nov. 24, 2015

(54) SYSTEM AND METHOD FOR GENERATING A USER INTERFACE FOR TEXT AND ITEM SELECTION

(75) Inventor: Nicholas D. Doerring, San Francisco, CA (US)

(73) Assignee: OpenTV, Inc., San Francisco, CA (US)

(*) Notice: Subject to any disclaimer, the term of this patent is extended or adjusted under 35 U.S.C. 154(b) by 320 days.

(21) Appl. No.: 12/366,293

(22) Filed: Feb. 5, 2009

(65) Prior Publication Data

US 2010/0199224 A1   Aug. 5, 2010

(51) Int. Cl.
  *G06F 3/048*   (2013.01)
  *G06F 3/023*   (2006.01)
  *G06F 3/0482*  (2013.01)
  *G06F 3/0484*  (2013.01)

(52) U.S. Cl.
  CPC ............ *G06F 3/0236* (2013.01); *G06F 3/0482* (2013.01); *G06F 3/04842* (2013.01); *G06F 2203/04806* (2013.01)

(58) Field of Classification Search
  CPC . G06F 3/0236; G06F 3/0482; G06F 3/04842; G06F 2203/04806
  USPC ........................................................ 715/856
  See application file for complete search history.

(56) References Cited

U.S. PATENT DOCUMENTS

| | | | |
|---|---|---|---|
| 4,794,388 A * | 12/1988 | Matthews | 345/661 |
| 5,185,628 A * | 2/1993 | Wilson et al. | 399/81 |
| 5,748,185 A * | 5/1998 | Stephan et al. | 345/173 |
| 5,844,559 A * | 12/1998 | Guha | G06F 3/0481 715/821 |
| 6,147,674 A * | 11/2000 | Rosenberg et al. | 345/157 |
| 6,219,586 B1 * | 4/2001 | Sakai | 700/182 |
| 6,341,201 B1 * | 1/2002 | Ishiguro | G03B 17/40 396/300 |
| 6,346,938 B1 * | 2/2002 | Chan et al. | 345/419 |
| 6,466,199 B2 * | 10/2002 | Takase | G06F 3/04812 345/157 |
| 6,621,992 B2 * | 9/2003 | Kishi | H04N 1/00384 399/81 |
| 6,640,185 B2 * | 10/2003 | Yokota et al. | 701/455 |
| 6,833,848 B1 * | 12/2004 | Wolff | G06F 17/30056 707/E17.009 |
| 6,954,219 B2 * | 10/2005 | Hermanson | 345/660 |
| 6,963,332 B1 * | 11/2005 | Watanabe | G06F 3/0233 345/161 |
| 6,972,776 B2 * | 12/2005 | Davis et al. | 345/684 |
| 7,075,513 B2 * | 7/2006 | Silfverberg et al. | 345/157 |
| 7,091,998 B2 * | 8/2006 | Miller-Smith | 715/810 |
| 7,102,541 B2 * | 9/2006 | Rosenberg | 341/20 |
| 7,106,300 B2 * | 9/2006 | Saylor | G02B 21/365 318/640 |
| 7,154,526 B2 * | 12/2006 | Foote et al. | 348/14.08 |
| 7,240,293 B2 * | 7/2007 | Lungwitz et al. | 715/780 |
| 7,254,785 B2 * | 8/2007 | Reed | G06F 3/0481 715/738 |

(Continued)

*Primary Examiner* — Jessica Chuang
(74) *Attorney, Agent, or Firm* — Schwegman Lundberg & Woessner, P.A.

(57) ABSTRACT

A system and method for generating a user interface for text and item selection is disclosed. As described for various embodiments, a system and process is disclosed for providing an arrangement of selectable items, a mechanism for selection from the arrangement of selectable items, and a mechanism for adjusting the granularity of control of the selector. In one embodiment, the granularity control can be a zooming mechanism to modify the size and/or position of items in a selection set. In another embodiment, the granularity control can be a modification of the motion vector based on a distance from a reference point and the speed or quantity of deflection of a pointing device. Thus, as a selection point approaches the selection set, the motion of the selection point becomes less responsive to movement of the pointing device, so the user has more control over the positioning of the selection point relative to an item in the selection set.

13 Claims, 14 Drawing Sheets

(56) References Cited

U.S. PATENT DOCUMENTS

| | | | | |
|---|---|---|---|---|
| 7,260,788 | B2* | 8/2007 | Arai | 715/834 |
| 7,630,148 | B1* | 12/2009 | Yang et al. | 359/740 |
| 7,672,692 | B2* | 3/2010 | Nishino et al. | 455/566 |
| 7,739,604 | B1* | 6/2010 | Lyons | G06F 3/0486 709/213 |
| 7,861,179 | B2* | 12/2010 | Reed | 715/763 |
| 8,046,705 | B2* | 10/2011 | Hunleth et al. | 715/765 |
| 8,062,126 | B2* | 11/2011 | Marks et al. | 463/30 |
| 8,194,037 | B2* | 6/2012 | Kerr et al. | 345/158 |
| 8,274,534 | B2* | 9/2012 | Montague | 345/661 |
| 8,277,316 | B2* | 10/2012 | Haigh-Hutchinson | 463/31 |
| 8,287,374 | B2* | 10/2012 | Pryor | 463/37 |
| 8,314,789 | B2* | 11/2012 | Fitzmaurice et al. | 345/419 |
| 8,341,544 | B2* | 12/2012 | Kerr et al. | 715/786 |
| 8,341,553 | B2* | 12/2012 | Reed | G06F 3/0481 715/738 |
| 8,373,655 | B2* | 2/2013 | Miller et al. | 345/157 |
| 8,397,180 | B2* | 3/2013 | Duhig | 715/838 |
| 9,039,533 | B2* | 5/2015 | Barney | A63F 13/10 463/36 |
| 2002/0084984 | A1* | 7/2002 | Beinor | 345/161 |
| 2003/0043114 | A1* | 3/2003 | Silfverberg et al. | 345/157 |
| 2003/0117419 | A1* | 6/2003 | Hermanson | 345/660 |
| 2003/0154327 | A1* | 8/2003 | Lungwitz et al. | 710/1 |
| 2004/0017355 | A1* | 1/2004 | Shim | 345/157 |
| 2004/0108992 | A1* | 6/2004 | Rosenberg | 345/156 |
| 2004/0160416 | A1* | 8/2004 | Venolia | 345/157 |
| 2004/0183817 | A1* | 9/2004 | Kaasila | 345/660 |
| 2004/0252119 | A1* | 12/2004 | Hunleth et al. | 345/440 |
| 2005/0052345 | A1* | 3/2005 | Bollhoefer | G06F 3/0386 345/32 |
| 2006/0146019 | A1* | 7/2006 | Ahlgren | G06F 3/0338 345/161 |
| 2006/0268100 | A1* | 11/2006 | Karukka et al. | 348/14.01 |
| 2006/0277489 | A1* | 12/2006 | Maehiro et al. | 715/786 |
| 2006/0288314 | A1* | 12/2006 | Robertson | G06F 3/04812 715/863 |
| 2007/0117625 | A1* | 5/2007 | Marks et al. | 463/30 |
| 2007/0192744 | A1* | 8/2007 | Reponen | 715/833 |
| 2008/0007753 | A1* | 1/2008 | Regenmorter | 358/1.12 |
| 2008/0015841 | A1* | 1/2008 | Longe et al. | 704/1 |
| 2008/0036772 | A1* | 2/2008 | Bae | 345/442 |
| 2008/0040671 | A1* | 2/2008 | Reed | 715/738 |
| 2008/0074389 | A1* | 3/2008 | Beale | G06F 3/013 345/161 |
| 2008/0155473 | A1* | 6/2008 | Duhig | 715/818 |
| 2008/0168364 | A1* | 7/2008 | Miller et al. | 715/762 |
| 2008/0222530 | A1* | 9/2008 | Lakshmanan et al. | 715/735 |
| 2008/0281442 | A1* | 11/2008 | Huckemann | B60K 37/06 700/85 |
| 2009/0031240 | A1* | 1/2009 | Hildreth | 715/772 |
| 2009/0083660 | A1* | 3/2009 | Lettau | 715/784 |
| 2009/0187860 | A1* | 7/2009 | Fleck | G06F 3/0482 715/834 |
| 2009/0249257 | A1* | 10/2009 | Bove | G06F 3/04812 715/858 |
| 2009/0262072 | A1* | 10/2009 | Chen | G06F 3/03547 345/157 |
| 2009/0262086 | A1* | 10/2009 | Chen | G06F 3/0488 345/173 |
| 2010/0079500 | A1* | 4/2010 | O'Sullivan et al. | 345/661 |
| 2010/0192102 | A1* | 7/2010 | Chmielewski | G06F 3/04817 715/834 |

* cited by examiner

SYSTEM AND METHOD FOR GENERATING A USER INTERFACE FOR TEXT AND ITEM SELECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2009, OpenTV Inc., All Rights Reserved.

BACKGROUND

1. Technical Field

This disclosure relates to methods and systems supporting computing and data processing systems. More particularly, a system and method for generating a user interface for text and item selection is described.

2. Related Art

Conventional systems, like www.twostick.org, can display two-dimensional grid of alphanumeric characters from which a user can make selections. These conventional systems allow a user to manipulate a joystick or game controller to navigate right, left, up, and down within the grid to identify and select a desired character. Other conventional systems provide a displayed on-screen replica of a standard two-dimensional keyboard that can be navigated in a similar two-dimensional manner. However, these conventional user interfaces for text input can be slow and awkward to use.

U.S. Pat. No. 6,593,913 describes a method and system for selecting a character with a user input device comprising a plurality of buttons. In one preferred embodiment, a first plurality of characters is displayed on a display device in a pattern corresponding to a pattern of a plurality of buttons of a user input device, and a character from the first plurality of characters is selected in response to actuation of one of the plurality of buttons. In this embodiment, the number of characters displayed on the display device for selection by the user input device is less than or equal to the number of buttons in the plurality of buttons. In this way, any of the characters displayed on the display device for selection by the user input device can be selected by actuation of a single one of the plurality of buttons.

U.S. Pat. No. 5,543,818 describes a method and apparatus for entering alphanumeric or other text to a computer system using an input device having a small number of keys. The computer system includes a processor programmed to display a character selection menu (including displayed groups of characters), to move a displayed cursor from one group to another in response to actuation of at least one cursor movement key on the input device, and to select a character within a group in response to actuation of one of at least two selection keys on the input device. The system reduces the maximum number of keystrokes required conventionally to select a character from a character set, and enables character selection from a larger set of displayed characters using no more keystrokes than required conventionally to select the same character from a smaller set.

U.S. Pat. No. 6,501,464 describes a graphical user interface in the form of a transparent keyboard may be positioned over an existing computer display. The user may input textual data through the keyboard by selecting keys in the transparent keyboard display. The text entry may then appear on the computer display in non-transparent or conventional format.

Thus, a system and method for generating a user interface for text and item selection are needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the various embodiments described herein may be practiced without these specific details. According to various example embodiments described herein, there is provided a system and method for generating a user interface for text and item selection.

Figure 1:
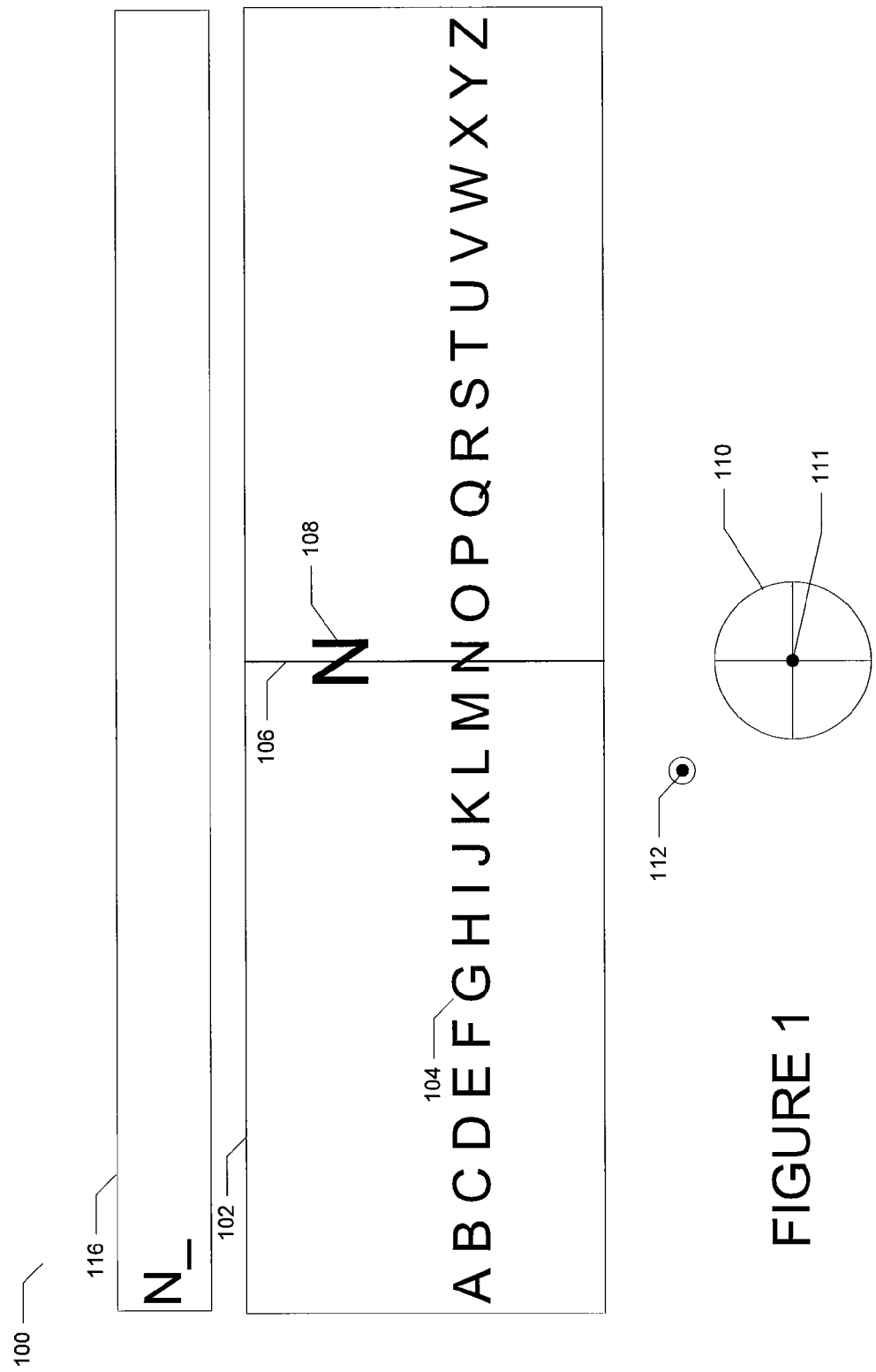
FIGS. 1-5 illustrate a particular example embodiment of a user interface for computer users, electronic game players, or television (TV) users in which an item selection set is arranged in a linear orientation.

FIG. 1 illustrates a particular example embodiment of a user interface for computer users, electronic game players, or TV users. As shown in FIG. 1, a user interface 100 is shown as may be displayed within a conventional display screen window on a computer display, electronic game system, or TV screen of a user. As described in more detail below, the user system may be connected or connectable to a pointing device, thumbstick device, mouse, TV remote device, a game controller device, spatial movement detection devices, such as the Wii system sold by Nintendo of America, Inc., or any other hardware or software device/system, which can signal movement in a two-dimensional space via a conventional hardware interface (hereinafter called a pointing device). The user system can use conventional hardware and operating system software to support the novel user interface 100 described herein.

The user interface 100 is created using the functionality of various embodiments described herein. Referring to FIG. 1, the user interface 100 in an example embodiment is comprised of a display region 102 (e.g., a window, a data entry box, etc.) in which a selection set 104 is displayed. In the embodiment shown, the selection set 104 is comprised of a set of items, each of which may represent an individually selectable option. In this case, the items in selection set 104 are letters of the English language alphabet. In other embodiments, the items can be a set of selectable alphanumeric characters, alphanumeric characters plus special characters, alphanumeric characters in a language other than English, mathematical symbols, geometric shapes, icons, logos, drawing primitives, objects, images, device objects, or any of a variety of other types of selectable items. In the embodiment illustrated in FIG. 1, the selection set 104 is configured in a linear pattern of evenly-spaced items extending to the borders of display region 102. In the embodiment shown in FIG. 1, a selection vector 106 is shown in the center of the display region 102. The selection vector 106 is used to mark a location in display region 102 at which one of the items in selection set 104 is selectable. In other words, if an item in selection set 104 overlays (or is in proximity to) selection vector 106, that item can be selected using selection button 112. For clarity, the selectable item overlaying (or in proximity to) selection vector 106 is reproduced as selectable item 108 as shown in FIG. 1. Thus, as shown in the example embodiment of FIG. 1, the letter, 'N' of selection set 104 is in proximity to selection vector 106. Therefore, the letter, 'N' is reproduced as selectable item 108 as shown in FIG. 1. If a user of user interface 100 shown in FIG. 1 wishes to select the selectable item 108, the user can activate selection button 112. It will be apparent to those of ordinary skill in the art that selection button 112 can be any form of signal generation device, such as a hardware button or softkey located anywhere on a remote device, a gesture detection device, audible command detection device, or the like. As a result of this activation of selection button 112, the selected item is saved in an item string created and saved in display area 116. Thus, as shown in the example embodiment of FIG. 1, the letter, 'N' of selection set 104 has been selected by a user by user activation of selection button 112 and the selected item (i.e., letter, 'N') has been saved in the current position of the item string in display area 116. The next position in the item string of display area 116 is represented by the underscore character shown in display region 116 of FIG. 1. In a particular embodiment, a backspace button or item selection can be provided to clear a previous entry and move the string insertion point (i.e., an underscore character) backward one position.

The example of FIG. 1 also illustrates a pointing device 111, which can be deflected (or used to point) in two dimensions about a center point of a motion area 110 of the pointing device 111 as shown in FIG. 1. The pointing device 111 is shown in FIG. 1 at its neutral position (e.g., undeflected position, center position, or home position) at the center point of the pointing device motion area 110. In the neutral position, the selection set 104 remains static at its current position. In the example of FIG. 1, the current position is as shown with the letter, 'N' of selection set 104 in proximity to selection vector 106. As described in more detail below, the deflection of the pointing device 111 causes a corresponding linear motion of the selection set 104 in relation to the selection vector 106. In various embodiments, the pointing device 111 can signal movement in two dimensions simultaneously or may indicate separate movements in just one direction. Additionally, other types of pointing devices may indicate a vector movement relative to a point (e.g., the center of the motion area 110). Any of these pointing devices can be used with the various embodiments described herein.

Figure 2:
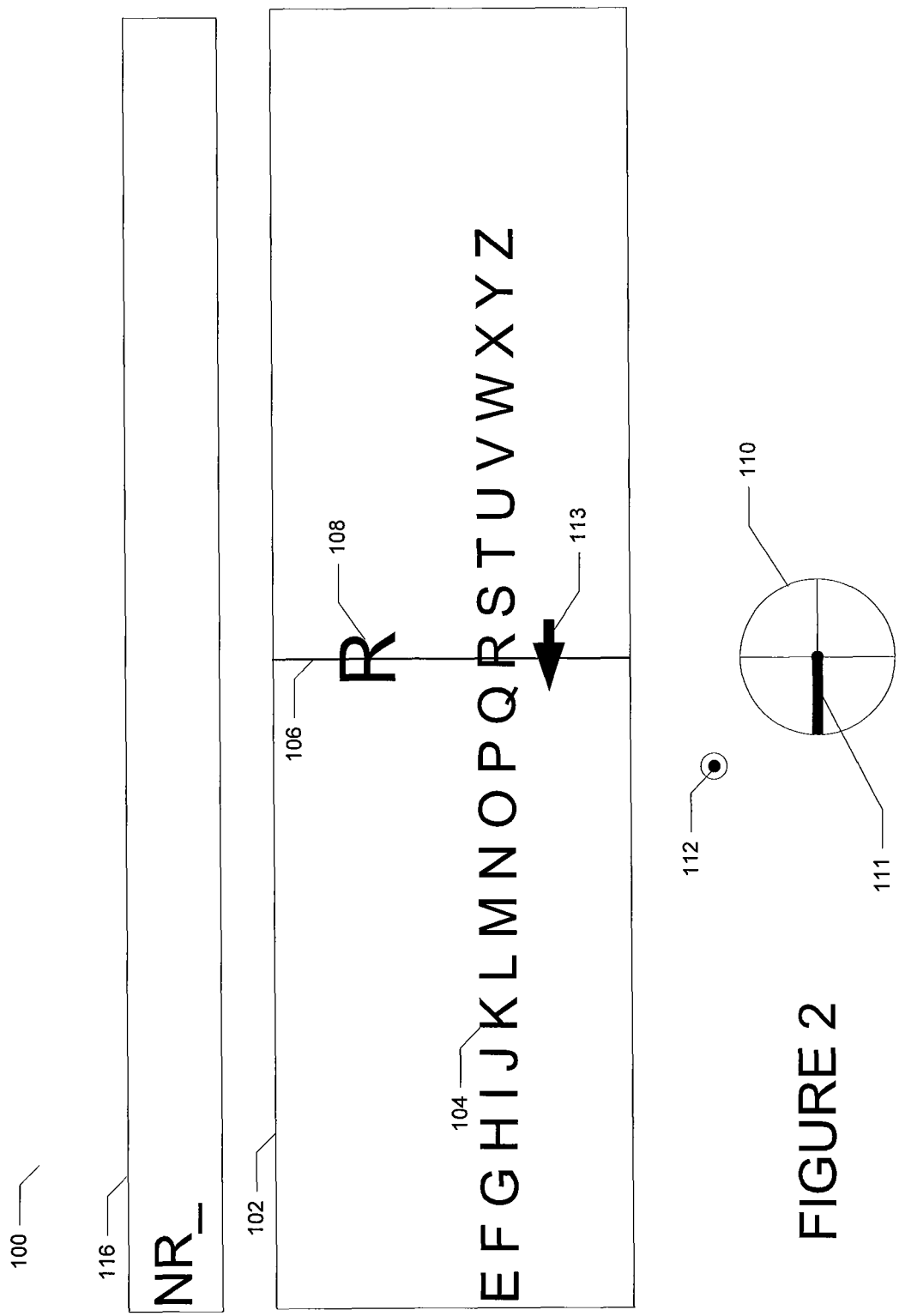

Referring now to the example embodiment shown in FIG. 2, the user interface 100 is shown after a user has selected an item from the selection set 104 by activation of selection button 112 while the desired item is positioned in proximity to selection vector 106. In this particular case, the user has selected the letter, 'N' of selection set 104 and the selected item has been reproduced in the display region 116. As shown in the example of FIG. 2, the user has deflected the pointing device 111 to the left (the 270° position) as illustrated by the vector shown in the representation of the pointing device motion area 110 illustrated in FIG. 2. In response to this pointing device 111 deflection, the selection set 104 is set in a relatively slow fluid motion to the left as shown by the arrow 113 in FIG. 2. The selection vector 106 remains stationary. As a result, the items in selection set 104 pass over the selection vector 106 as long as the pointing device remains deflected to the left. As each item of selection set 104 passes over the selection vector 106, the corresponding item is reproduced as selectable item 108. The appearance of selectable item 108 indicates to the user that the selectable item 108 can be selected by the user and copied to the display area 116, if the selection button 112 is activated at the moment the desired item is over the selection vector 106 and displayed as selectable item 108. In a particular embodiment, the speed at which the selection set moves can be controlled by the degree of deflection of the pointing device 111 to the left or right (the 90° position). For example, if the pointing device 111 is only slightly deflected to the left or right, the selection set 104 can move at a slow rate to the corresponding direction left or right. If the pointing device 111 is fully deflected to the left or right, the selection set 104 can move at a fast rate to the corresponding direction left or right. The speed of movement of the selection set for a particular level of deflection of the pointing device 111 can be pre-configured in a particular embodiment. Thus, in the manner as shown in the example of FIG. 2, a user can move the selection set 104 to the left with left deflection of the pointing device 111 to position a desired item in the selection set 104 over the selection vector 106. In the example of FIG. 2, the user has moved the selection set 104 to the left with left deflection of the pointing device 111, positioned a desired item (e.g., the letter 'R') in the selection set 104 over the selection vector 106, and activated selection button 112. As a result, the selected item (e.g., the letter 'R') has been copied to the display area 116 and the string insertion point (i.e., an underscore character) has been advanced one position to the right to mark the point in the string at which the next selected item will be inserted in the item string being assembled in display area 116.

Figure 3:
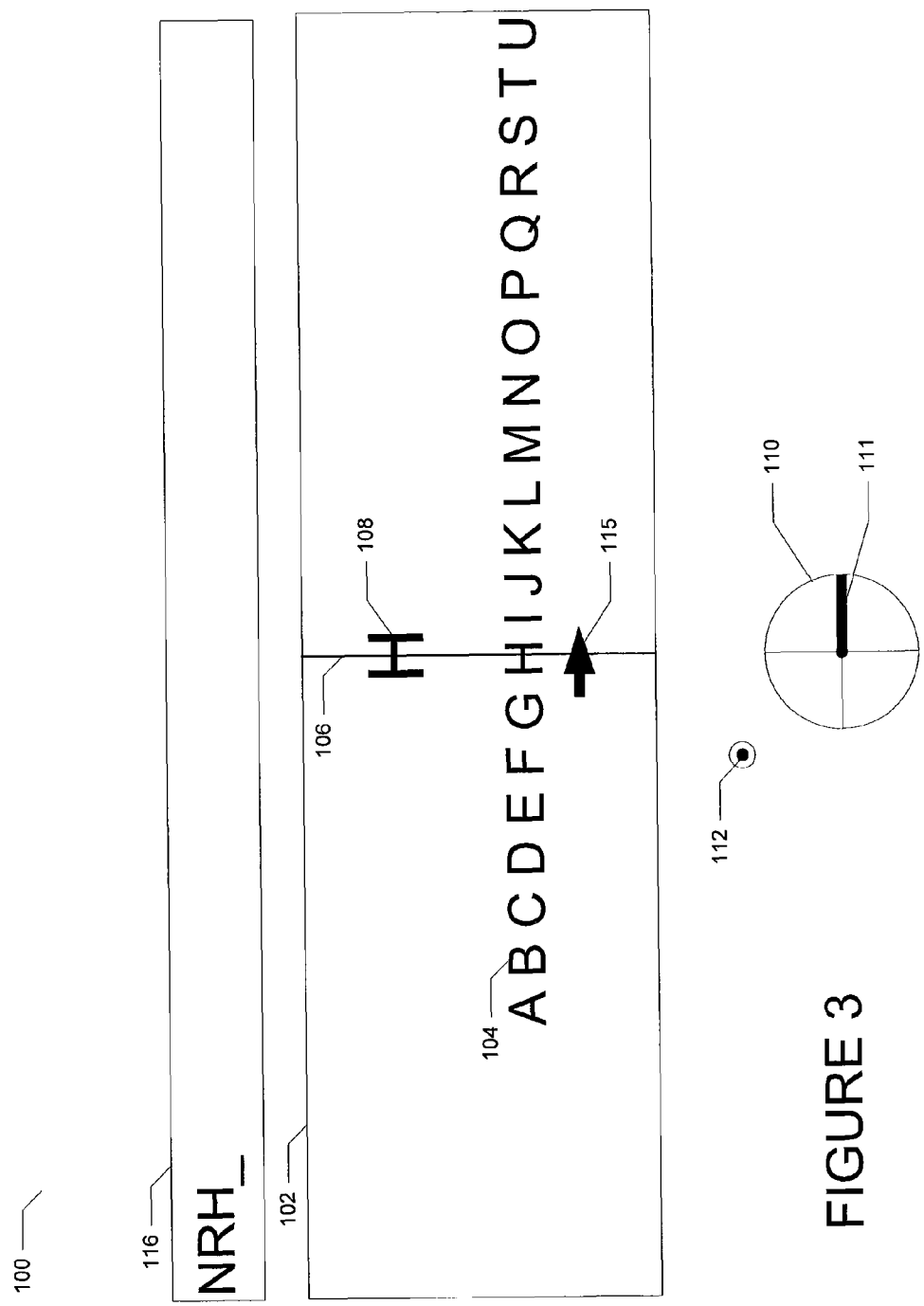

Referring now to the example embodiment shown in FIG. 3, the user has deflected the pointing device 111 to the right (the 90° position) as illustrated by the vector shown in the representation of the pointing device motion area 110 illustrated in FIG. 3. In response to this pointing device 111 deflection, the selection set 104 is set in a relatively slow fluid motion to the right as shown by the arrow 115 in FIG. 3. Again, the selection vector 106 remains stationary. As a result, the items in selection set 104 pass over the selection vector 106 as long as the pointing device remains deflected to the right. As each item of selection set 104 passes over the selection vector 106, the corresponding item is reproduced as selectable item 108 as described above. Again, the speed at which the selection set moves to the right can be controlled by the degree of deflection of the pointing device 111 to the right. Thus, in the manner as shown in the example of FIG. 3, a user can move the selection set 104 to the right with right deflection of the pointing device 111 to position a desired item in the selection set 104 over the selection vector 106. In the example of FIG. 3, the user has moved the selection set 104 to the right with right deflection of the pointing device 111, positioned a desired item (e.g., the letter 'H') in the selection set 104 over the selection vector 106, and activated selection button 112. As a result, the selected item (e.g., the letter 'H') has been copied to the display area 116 and the string insertion point (i.e., an underscore character) has been advanced one position to the right to mark the point in the string at which the next selected item will be inserted in the item string being assembled in display area 116.

Figure 4:
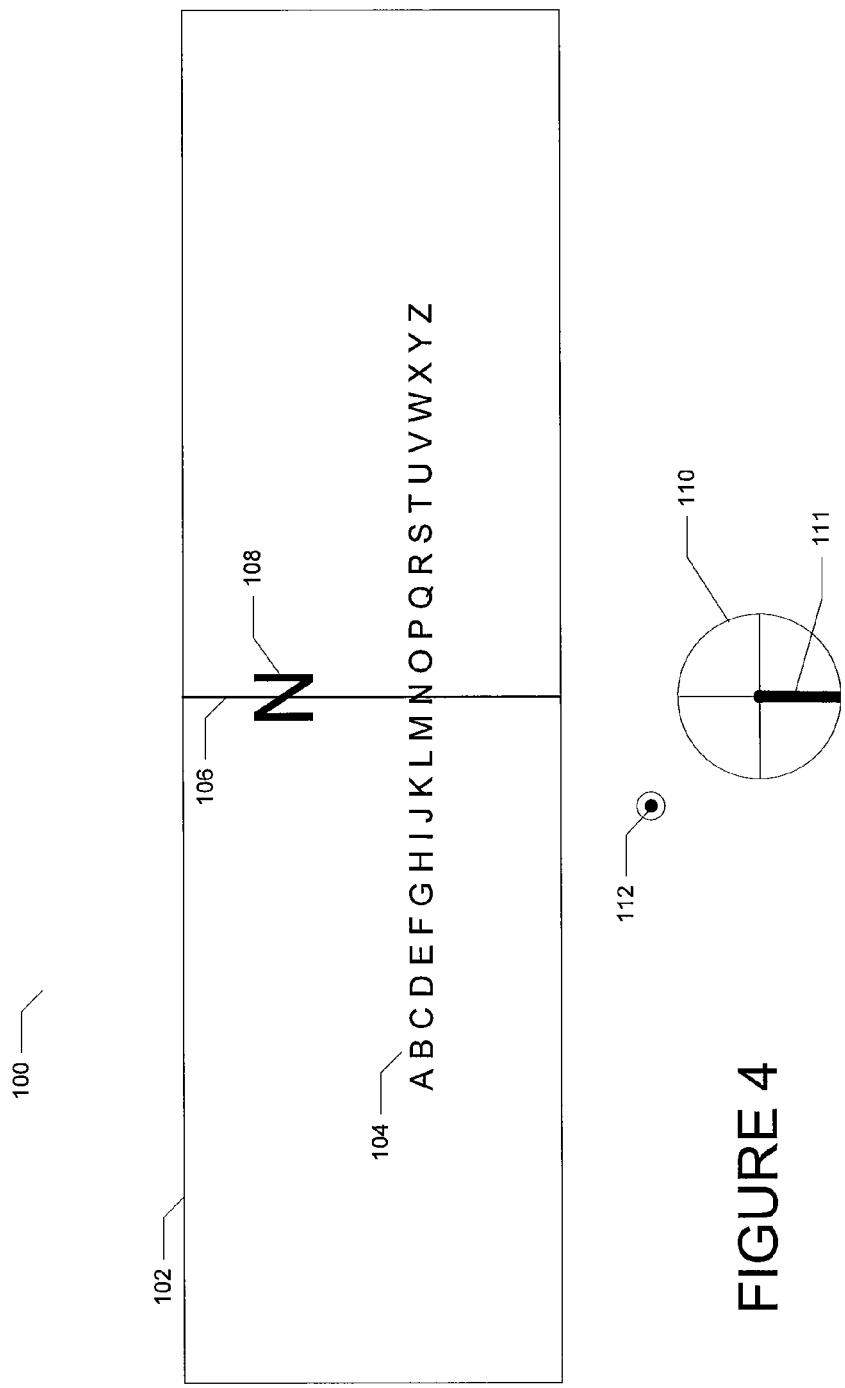

Referring now to the example embodiment shown in FIG. 4, a selection set zooming feature of a particular embodiment is illustrated. As shown in FIG. 4, the user has deflected the pointing device 111 in a downward (the 180° position) direction as illustrated by the vector shown in the representation of the pointing device motion area 110 illustrated in FIG. 4. In response to this pointing device 111 deflection, the items in selection set 104 have been reduced in size a relatively slow fluid motion to simulate a zoom out operation in a view of the selection set 104. One effect of the zoom out operation as shown in the example of FIG. 4 is that the spacing between the items in selection set 104 has been selectively reduced based on the amount of downward deflection of the pointing device 111 and the length of time the pointing device 111 is deflected downward. With the resulting reduced spacing between items in selection set 104, the user can more quickly navigate to a desired item with a left or right deflection of the pointing device 111. In cases where there may be many items in selection set 104, it may be desirable to use the zoom out operation provided in a particular embodiment to more quickly reach an item in selection set 104 that is located a relatively large distance away from the selection vector 106. Thus, in the manner as shown in the example of FIG. 4, a user can perform a zoom out operation to more quickly navigate to a desired item with a left or right deflection of the pointing device 111. After a zoom out operation has been performed as described above, the user is still given the opportunity to move the selection set 104 to the right or left with right or left deflection of the pointing device 111 to position a desired item in the selection set 104 over the selection vector 106 and make an item selection.

Figure 5:
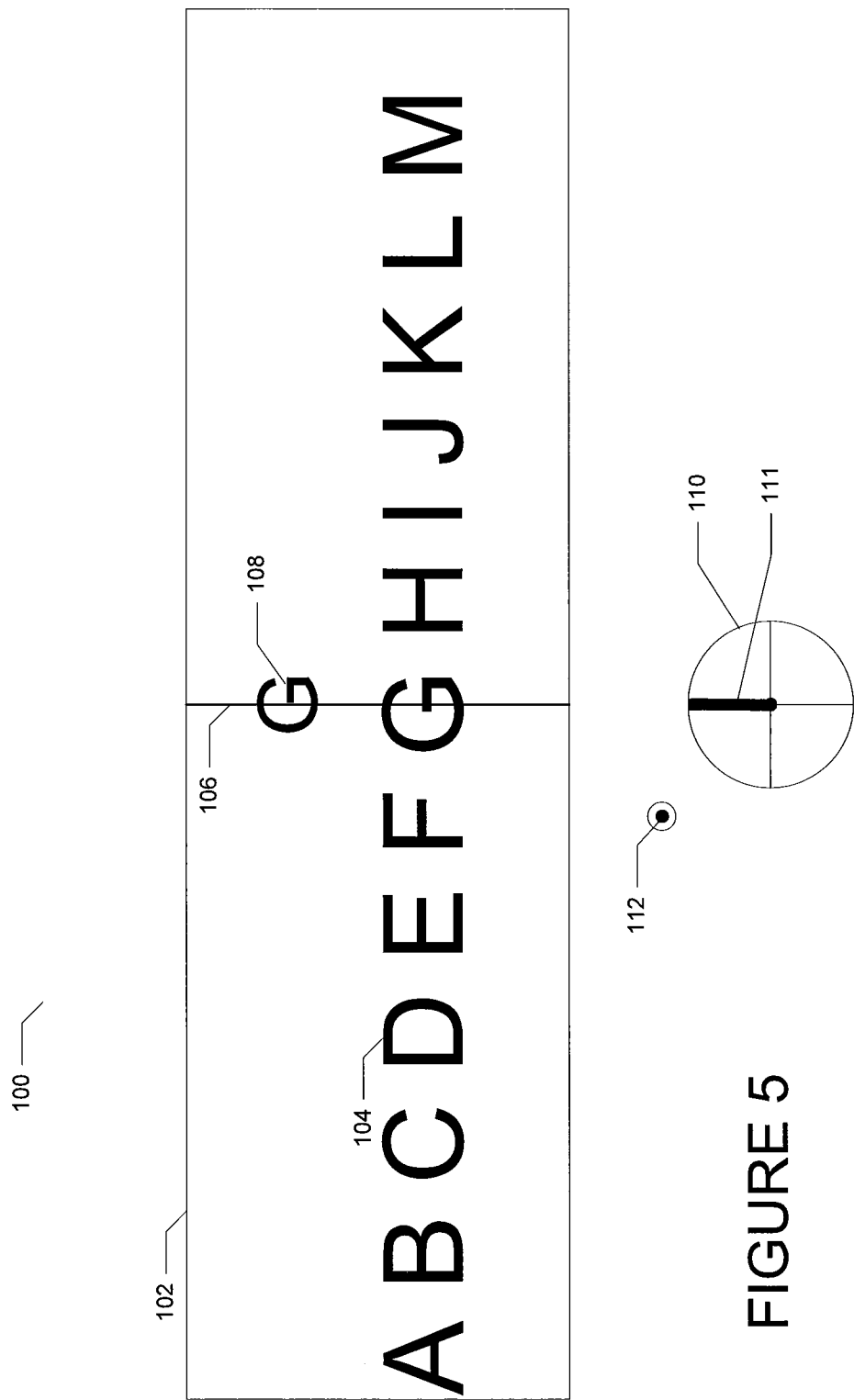

Referring now to the example embodiment shown in FIG. 5, the selection set zooming feature of a particular embodiment is further illustrated. As shown in FIG. 5, the user has deflected the pointing device 111 in an upward (the 0° or 360° position) direction as illustrated by the vector shown in the representation of the pointing device motion area 110 illustrated in FIG. 5. In response to this pointing device 111 upward deflection, the items in selection set 104 have been enlarged in a relatively slow fluid motion to simulate a zoom in operation in a view of the selection set 104. One effect of the zoom in operation as shown in the example of FIG. 5 is that the spacing between the items in selection set 104 has been selectively increased based on the amount of upward deflection of the pointing device 111 and the length of time the pointing device 111 is deflected upward. With the resulting increased spacing between items in selection set 104, the user can more accurately navigate to a desired item with a left or right deflection of the pointing device 111. In cases where there may be only a few items in selection set 104 or the items are densely packed together because of display area space limitations, it may be desirable to use the zoom in operation provided in a particular embodiment to more accurately reach an item in selection set 104. Thus, in the manner as shown in the example of FIG. 5, a user can perform a zoom in operation to more accurately navigate to a desired item with a left or right deflection of the pointing device 111. After a zoom in operation has been performed as described above, the user is still given the opportunity to move the selection set 104 to the right or left with right or left deflection of the pointing device 111 to position a desired item in the selection set 104 over the selection vector 106 and make an item selection.

In an alternative embodiment of the linearly arranged selection set 104 embodiment 100 as shown in FIGS. 1-5, the selection set 104 can be held stationary and the selection vector 106 can be moved to the left or right within display area 102 with a corresponding deflection of the pointing device 111 to the left or right. In this manner, a user can move the selection vector 106 to the right with right deflection of the pointing device 111 or left with a left deflection of the pointing device 111 to position the selection vector 106 over a desired item in the selection set 104. The selection of a desired item in the selection set 104 can be performed in the manner described above. Similarly, the zoom in and zoom out operations can be performed in the same manner as described above.

Figure 6:
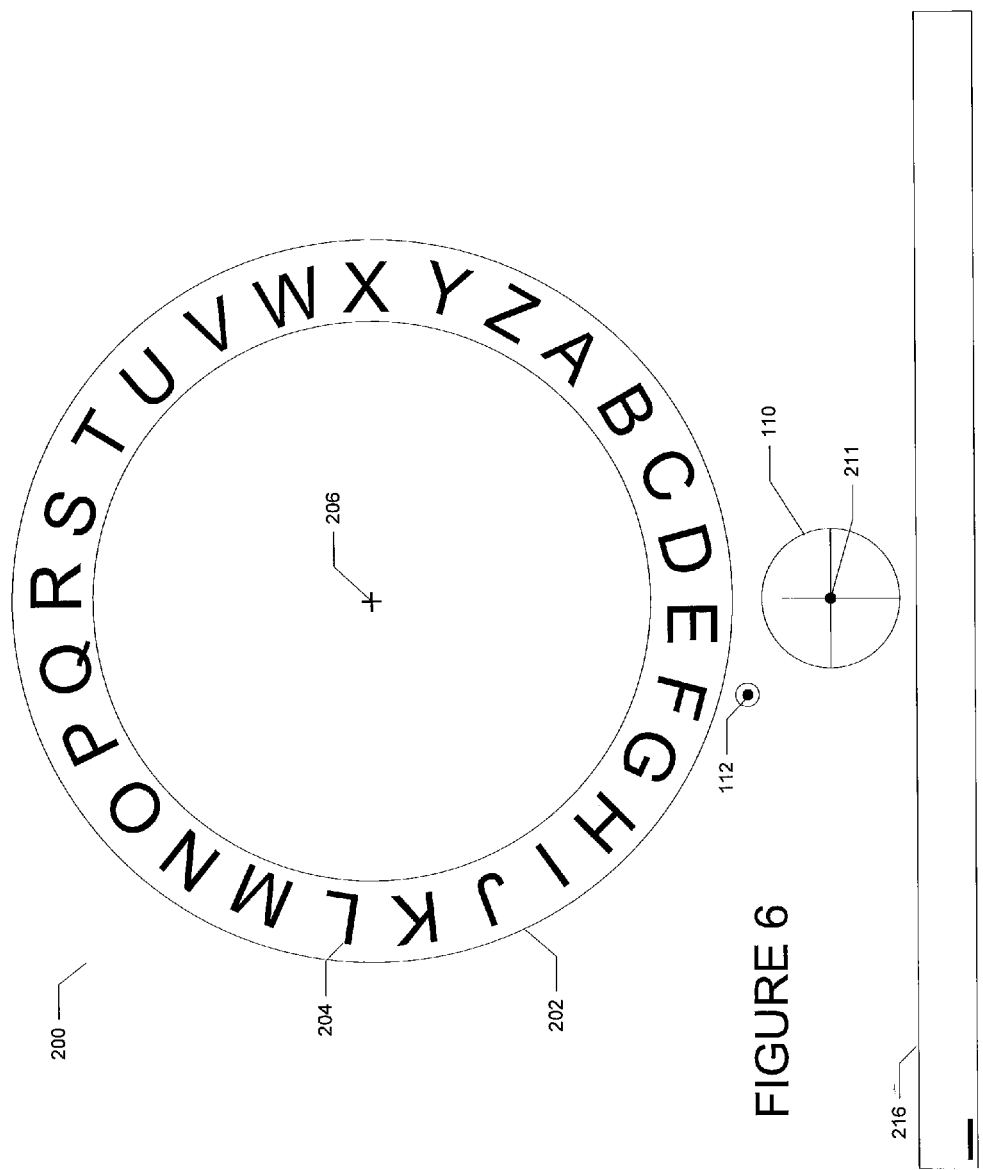
FIGS. 6-10 illustrate a particular example embodiment of a user interface for computer users or electronic game players in which an item selection set is arranged in a circular orientation.

Referring now to FIGS. 6-10, an example embodiment 200 of a circularly arranged selection set 204 embodiment is shown. In the particular embodiment shown, the circular item selection mechanism uses the same underlying principles as the linear embodiment described above. In the circular embodiment, the available items of selection set 204 are arranged in a circular display area 202 as shown in FIG. 6. In related embodiments, the selection set 204 can be arranged in an oval shape, a rectangular shape, or any other arbitrary shape. In these alternate embodiments, a radial position can be mapped to a particular location on an arbitrary shape. A small crosshair at the end of a selection vector 206 is also provided to define a particular selection point. As described in more detail below, the selection vector 206 and its crosshair indicator can be moved and positioned relative to the circularly arranged selection set 204 using two-dimensional movement of the pointing device 211 relative to the motion area 110 of the pointing device 211 as represented in FIGS. 6-10. As shown in FIG. 6, the pointing device 211 is at its neutral position (undeflected position) at the center point of the motion area 110 of the pointing device 211. In the neutral position, the selection vector 206 and its crosshair indicator remain positioned at the center of the circularly arranged selection set 204. As described above for display area 116, a display area 216 is provided in example embodiment 200 to assemble an item string. A string insertion point (i.e., an underscore character) is provided to mark the point in the string at which the next selected item will be inserted in the item string being assembled in display area 216.

Figure 7:
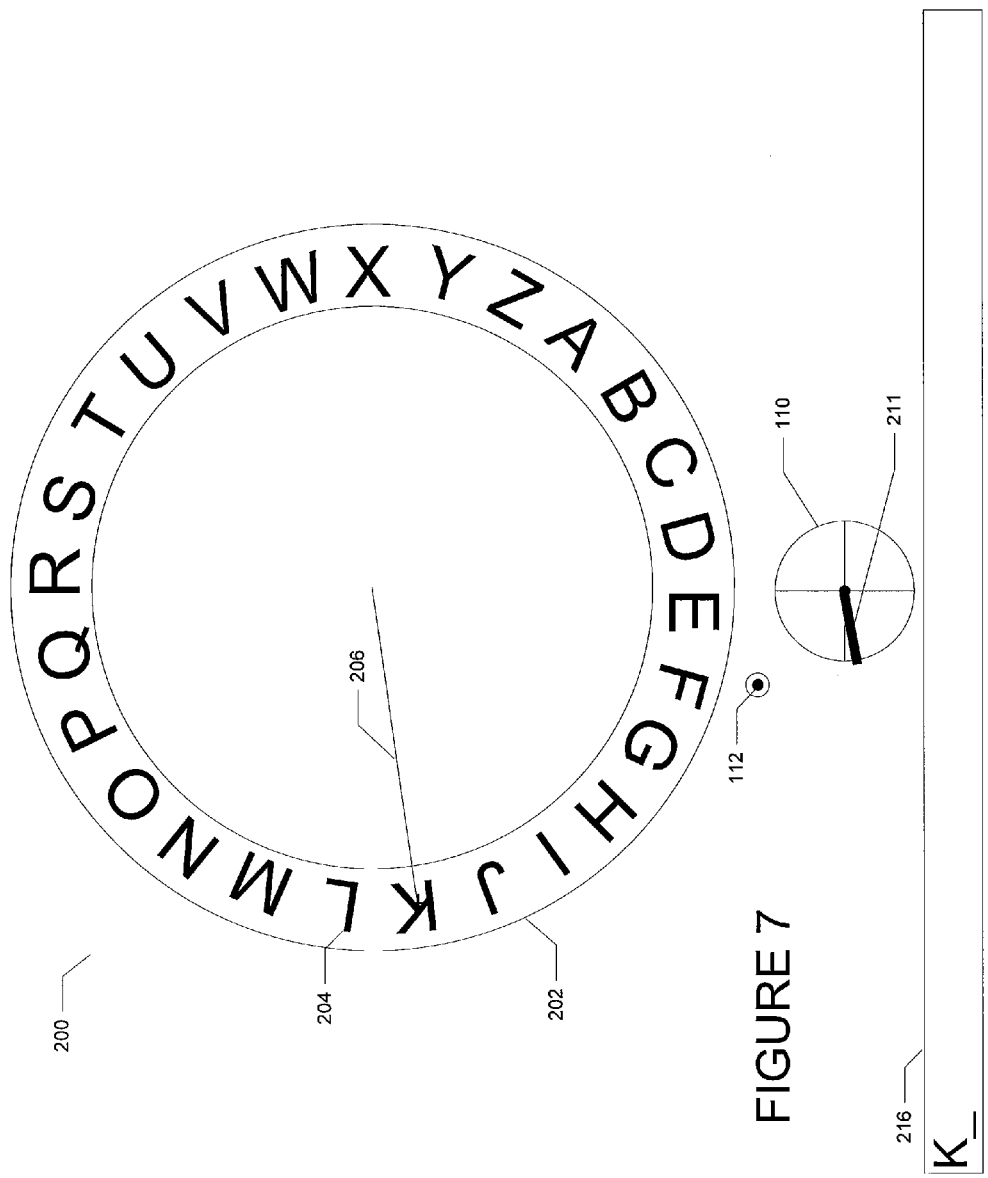

Referring now to the example embodiment shown in FIG. 7, the user has deflected the pointing device 211 to the left and slightly downward (the approx. 265° position) as illustrated by the vector shown in the representation of the pointing device motion area 110 illustrated in FIG. 7. In response to this pointing device 211 deflection, the selection vector 206 and its crosshair indicator (the selection point) has moved in a direction corresponding to the movement of the pointing device 211. In the example shown in FIG. 7, the selection vector 206 and its crosshair indicator has moved to overlay an item in the selection set 204. In this embodiment, the selection set 204 remains stationary. By using the pointing device 211 to position the selection vector 206 and its crosshair indicator over an item in the selection set 204, the user can identify a selectable item, which is in proximity to the crosshair indicator of selection vector 206. As the crosshair indicator of selection vector 206 is moved in proximity to an item of selection set 204, the selectable item identified thereby is highlighted or distinctively shaded/colored to indicate to the user that the selectable item can be selected by activation of selection button 112. If the user activates selection button 112, the selectable item in selection set 204 is copied to the insertion point position of display area 216 and the string insertion point (i.e., an underscore character) is advanced to the next position in the item string being assembled in display area 216. In the example shown in FIG. 7, the user has deflected the pointing device 211 to the left and slightly downward (the approx. 265° position) thereby causing the selection vector 206 and its crosshair indicator to move in a corresponding direction to overlay an item (e.g., letter 'K') in the selection set 204. The user has then activated selection button 112 thereby causing the selectable item (e.g., letter 'K'), identified by the movement of the selection vector 206 and its crosshair indicator, to be inserted at the insertion point of display area 216 as shown in FIG. 7. In this manner, a user can move the selection vector 206 and its crosshair indicator in two dimensions by a corresponding two-dimensional deflection of the pointing device 211 to position the selection vector 206 and its crosshair indicator over or in proximity to a desired item in the selection set 204. The selection of the desired item in the selection set 104 can be performed by activation of selection button 112 in the manner described above. In an alternative embodiment, the user does not need to position the crosshair indicator over or in proximity to a desired item in the selection set 204. Instead, the selection vector 206 can merely be moved in a direction towards a desired item selection and a radially projected selection vector 206 is used to identify and highlight a selectable item in the selection set 204. In this manner, the user does not have to move the crosshair of selection vector 216 completely out to the position of the desired item of selection set 204.

In a particular embodiment, the location of the selection point identified by the position of the crosshair of selection vector 216 is continuously updated in response to corresponding movement of the pointing device 211. The same deflection of the pointing device 211 can cause different effects based on the location of the selection point. For example, when the selection point is positioned near the center of the circular selection set 204, the movement of the selection point becomes more rapid relative to the movement of the pointing device 211. When the selection point is positioned furthest from the center of the circular selection set 204, the movement of the selection point becomes less rapid relative to the movement of the pointing device 211. In this manner, the user can quickly position the selection point in the selection set 204 while maintaining accurate control as the selection point approaches a desired item in selection set 204. In other words, the motion of the selection point slows as it nears the edge of the circular selection set 204 making it easier for a user to hone in on a target item. When the pointing device 211 is not deflected, the selection point is quickly pulled back to the center of the circular selection set 204.

Figure 9:
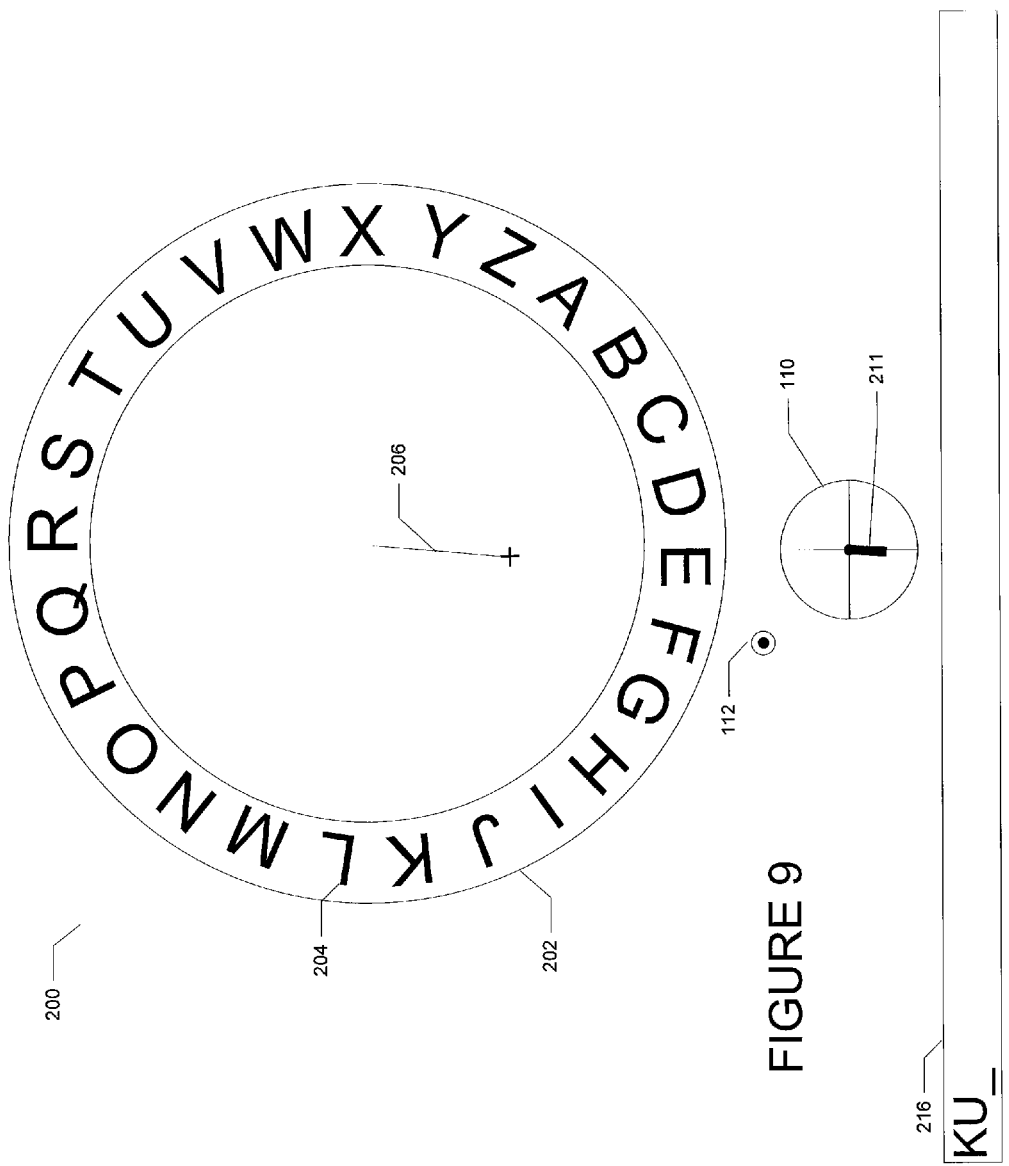

In a particular embodiment, the motion of the crosshair of selection vector 216 is always in the direction of deflection of the pointing device 211, but this motion can be taken from the current location of the crosshair. The magnitude of the motion vector as provided by the pointing device 211 can be relative to the current location of the crosshair. For example, the crosshair may start in the center of the circle and the pointing device 211 is then deflected as far as it can go in the 180 degree position. The selection position is updated by moving the crosshair down so that it is perhaps ⅓ radians from the center (i.e., not all the way down.) The user then changes the deflection of the pointing device 211 to the full 270 degree position. This time, the crosshair only moves ⅑ radians (because the crosshair is further from the center) and it moves from its current location to the left in response to the new deflection of the pointing device 211. In this case, the selection vector 206 would be pointing toward items, "F" or "G" as shown in FIG. 9 and would have a similar magnitude. In general, motion for a particular embodiment is computed by just adding deflection vectors to the current location, where the magnitude of the motion vector is adjusted based on the location of the crosshair relative to the center position and the magnitude of the deflection. So even if the user only keeps the pointing device 211 slightly deflected in a given direction, then the crosshair will still eventually reach the edge of the selection ring 202.

In a particular embodiment, the selectable item that can be selected is indicated by a white crosshair and the item turns red. In a particular embodiment, a few special symbols can be used to indicate special functions. For example:

'>' can be used for space;
'<' can be used for backspace;
'+' can select a next alphabet arrangement as a selection set;
'−' can select a previous alphabet arrangement as a selection set.

Figure 8:
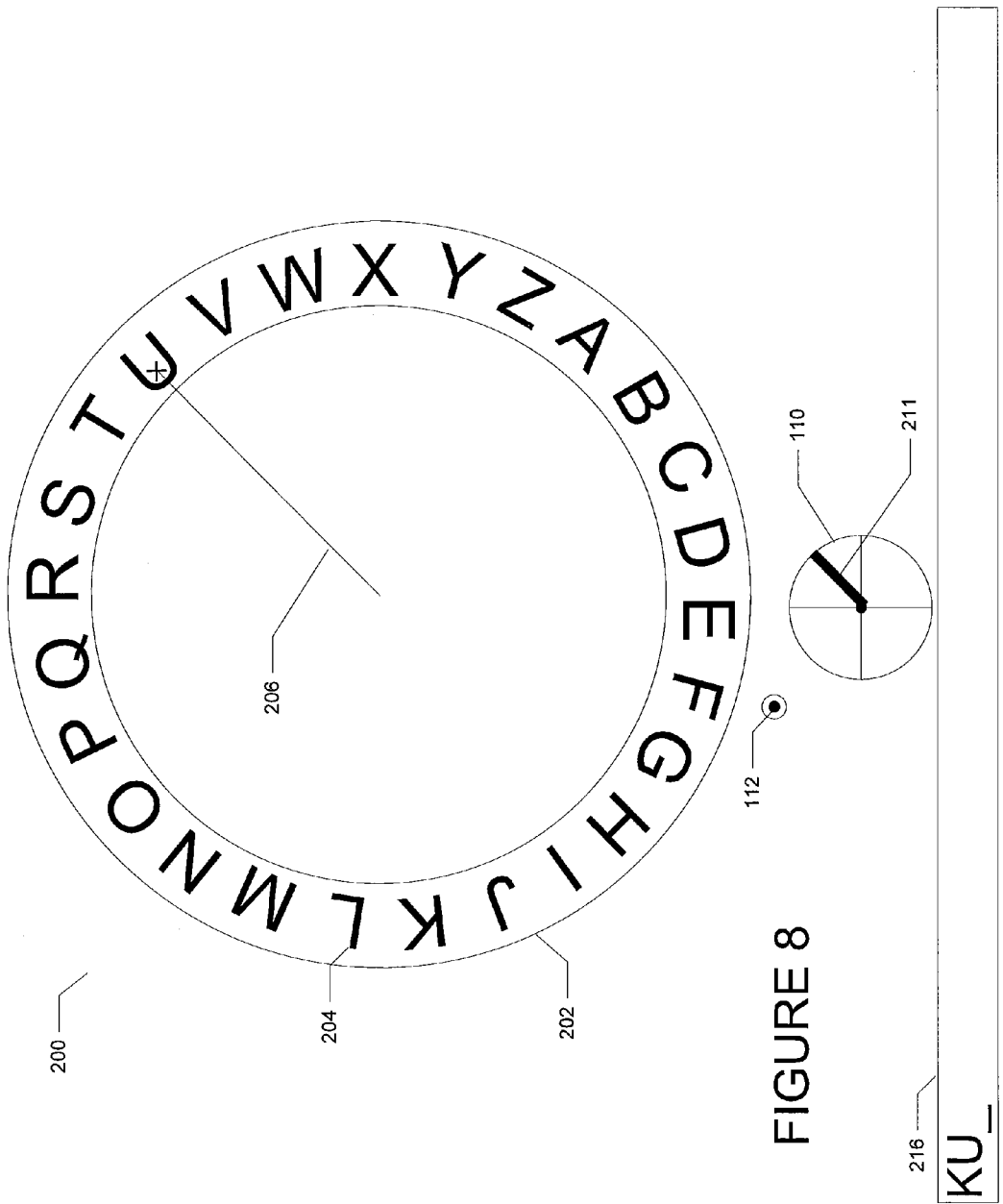

Referring now to the example embodiment shown in FIG. 8, the user has deflected the pointing device 211 to the right and upward (the approx. 45° position) as illustrated by the vector shown in the representation of the pointing device motion area 110 illustrated in FIG. 8. In response to this pointing device 211 deflection, the selection vector 206 and its crosshair indicator (the selection point) has moved in a direction corresponding to the movement of the pointing device 211. In the example shown in FIG. 8, the selection vector 206 and its crosshair indicator has moved to overlay an item in the circular selection set 204. In this embodiment, the selection set 204 remains stationary. As the crosshair indicator of selection vector 206 is moved in proximity to an item of selection set 204, the selectable item identified thereby can be highlighted or distinctively shaded/colored to indicate to the user that the selectable item can be selected by activation of selection button 112. In the example shown in FIG. 8, the user has deflected the pointing device 211 to the right and upward (the approx. 45° position) thereby causing the selection vector 206 and its crosshair indicator (the selection point) to move in a corresponding direction to overlay an item (e.g., letter 'U') in the selection set 204. The user has then activated selection button 112 thereby causing the selectable item (e.g., letter 'U'), identified by the selection point, to be inserted at the insertion point of display area 216 as shown in FIG. 8. In this manner, a user can move the selection point in two dimensions by a corresponding two-dimensional deflection of the pointing device 211 to position the selection point over a desired item in the selection set 204. The selection of the desired item in the selection set 104 can be performed by activation of selection button 112 in the manner described above.

Figure 10:
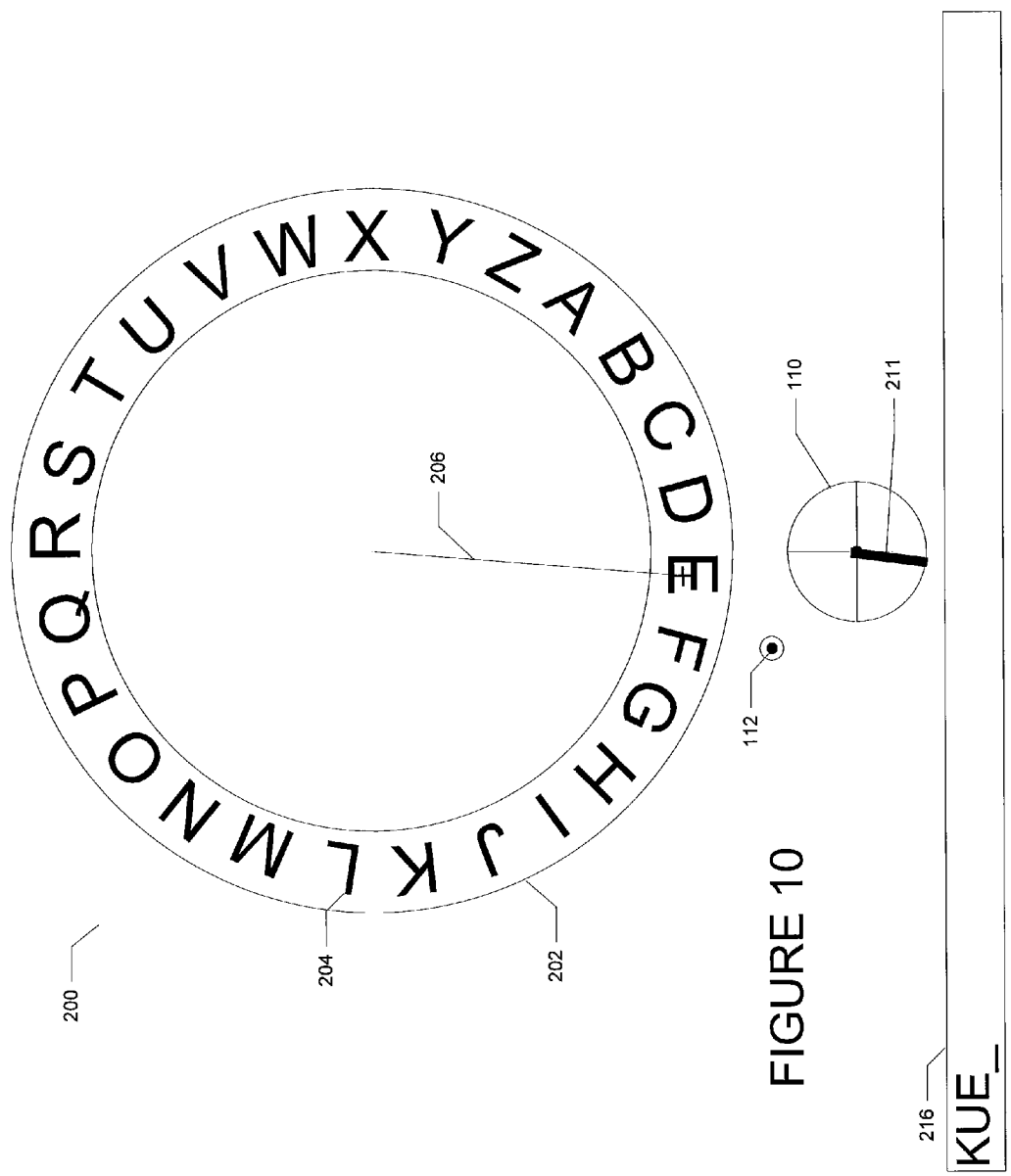

Referring now to the example embodiment shown in FIG. 9, the user has deflected the pointing device 211 downward and slightly to the left (the approx. 182° position) as illustrated by the vector shown in the representation of the pointing device motion area 110 illustrated in FIG. 9. In this example, the user has applied only a slight deflection of pointing device 211. In response to this pointing device 211 deflection, the selection vector 206 and its crosshair indicator (the selection point) has moved in a direction corresponding to the movement of the pointing device 211; but, the selection point has only slightly moved from the center position of the circular selection set 204 due to the corresponding slight deflection of pointing device 211. In the example shown in FIG. 8, the selection vector 206 and its crosshair indicator has not moved to overlay an item in the circular selection set 204; but, the user can apply a larger deflection to the pointing device 211 to select an item from the selection set 204 as described above. This larger deflection of pointing device 211 is shown in the example of FIG. 10. As illustrated in FIG. 10, the user has more fully deflected the pointing device 211 downward and slightly to the left (the approx. 182° position) as illustrated by the vector shown in the representation of the pointing device motion area 110. This deflection of pointing device 211 causes the selection vector 206 and its crosshair indicator (the selection point) to move in a corresponding direction to overlay an item (e.g., letter 'E') in the selection set 204. The user has then activated selection button 112 thereby causing the selectable item (e.g., letter 'E'), identified by the selection point, to be inserted at the insertion point of display area 216 as shown in FIG. 10. Again in this embodiment, the selection set 204 remains stationary while the selection vector 206 and its crosshair indicator (the selection point) moves in a manner corresponding to deflection of the pointing device 211.

In an alternative embodiment of the circularly arranged selection set 204 embodiment 200 as shown in FIGS. 6-10, the selection vector 206 and its crosshair indicator (the selection point) can be held stationary at a pre-defined position (e.g., at the 12-o'clock position of display area 202) and the circular selection set 204 can be rotated clockwise or counterclockwise within display area 202 with a corresponding deflection of the pointing device 211 to the right or left. In this manner, a user can move the selection set 204 underneath the stationary selection point with right or left deflection of the pointing device 211. Thus, an item of selection set 204 can be positioned in proximity to the selection point to identify a selectable item. The selection of a desired item in the selection set 204 can be performed in the manner described above. Similarly, the zoom in and zoom out operations can be performed in an embodiment of the circularly arranged selection set 204 in the same manner as described above.

Figure 11:
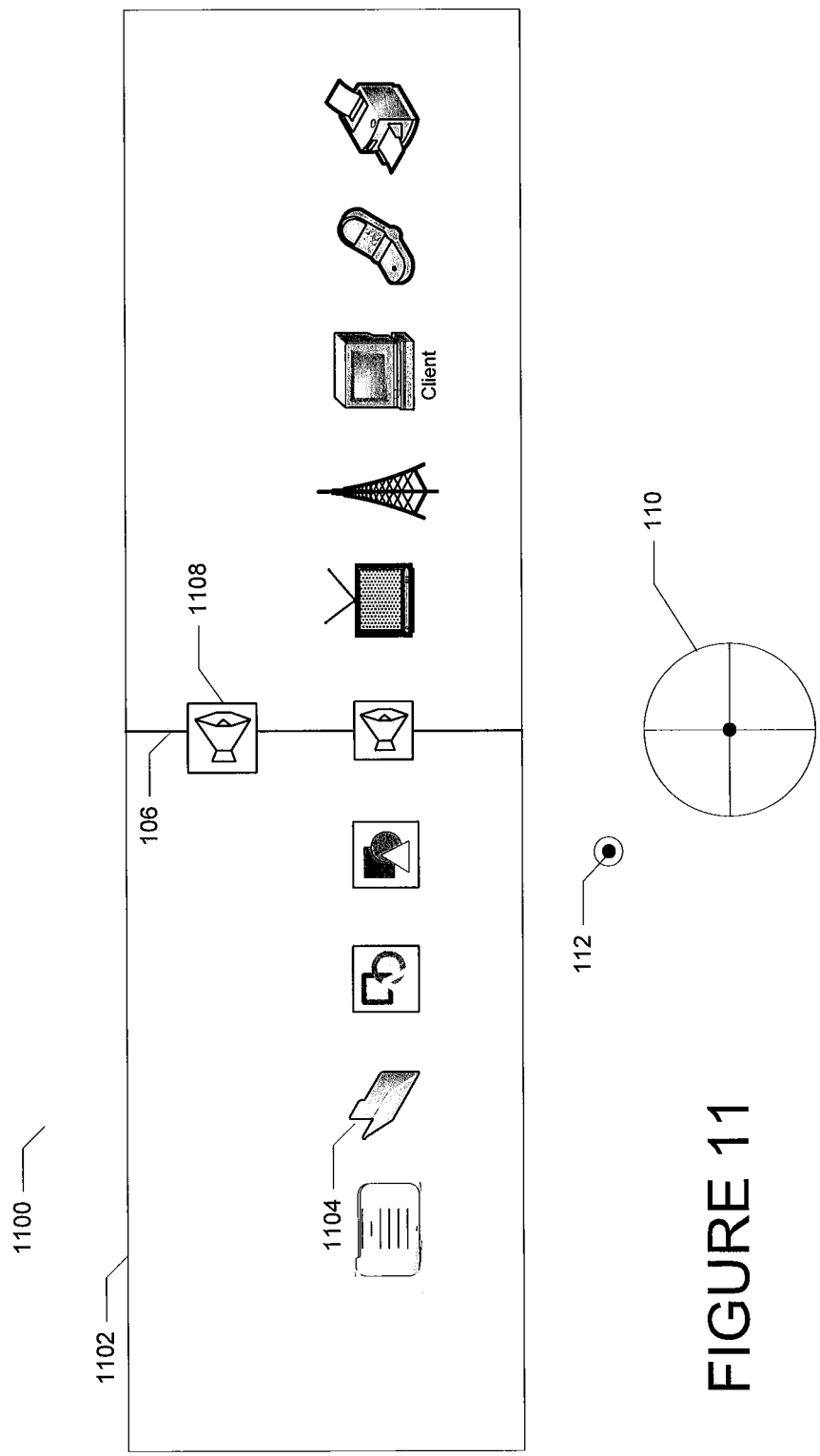
FIG. 11 illustrates a particular example embodiment of a user interface for computer users, electronic game players or TV users in which a selection set includes items representing a variety of physical or logical entities.

FIG. 11 illustrates a particular example embodiment of a user interface for computer users, electronic game players, or TV users in which a selection set includes items representing a variety of physical or logical entities. Referring now to an example embodiment illustrated in FIG. 11, a user interface 1100 of an example embodiment is comprised of a display region 1102 (e.g., a window, a data entry box, etc.) in which a selection set 1104 is displayed. In the embodiment shown, the selection set 1104 is comprised of a set of items, each of which may represent an individually selectable option. In this case, the items in selection set 1104 are geometric shapes, icons, logos, drawing primitives, objects, images, device objects, or any of a variety of other types of selectable items that each represent a corresponding physical device, a file folder, a file or document, an image, a video or audio stream, a communication device, mode, network, or protocol, or any of a variety of other types of objects or entities. In the embodiment illustrated in FIG. 1, the selection set 1104 is configured in a linear pattern of evenly-spaced items extending to the borders of display region 1102. In an alternative embodiment, the selection set 1104 may similarly be arranged in a circular selection set as described above. As described above, a selection vector 106 can be provided in the center of the display region 1102 to mark a location in display region 1102 at which one of the items in selection set 1104 is selectable. Similarly, in a circular selection set embodiment, a selection vector 206 and its crosshair indicator (the selection point) can be provided to identify a selectable item in selection set 1104 as described above. In this manner, a wide variety of selectable items can be made available for selection by a user using the various embodiments of the user interface described herein.

Thus, as described for various embodiments herein, a system and process is disclosed for providing an arrangement of selectable items, a mechanism for selection from the arrangement of selectable items, and a mechanism for adjusting the granularity of control of the selector. In one embodiment, the granularity control can be a zooming mechanism to modify the size and/or position of items in a selection set. In another embodiment, the granularity control can be a modification of the motion vector based on a distance from a reference point and the speed or quantity of deflection of a pointing device. Thus, as a selection point approaches the selection set, the motion of the selection point becomes less responsive to movement of the pointing device, so the user has more control over the positioning of the selection point relative to an item in the selection set.

Example Process Flow

Figure 12:
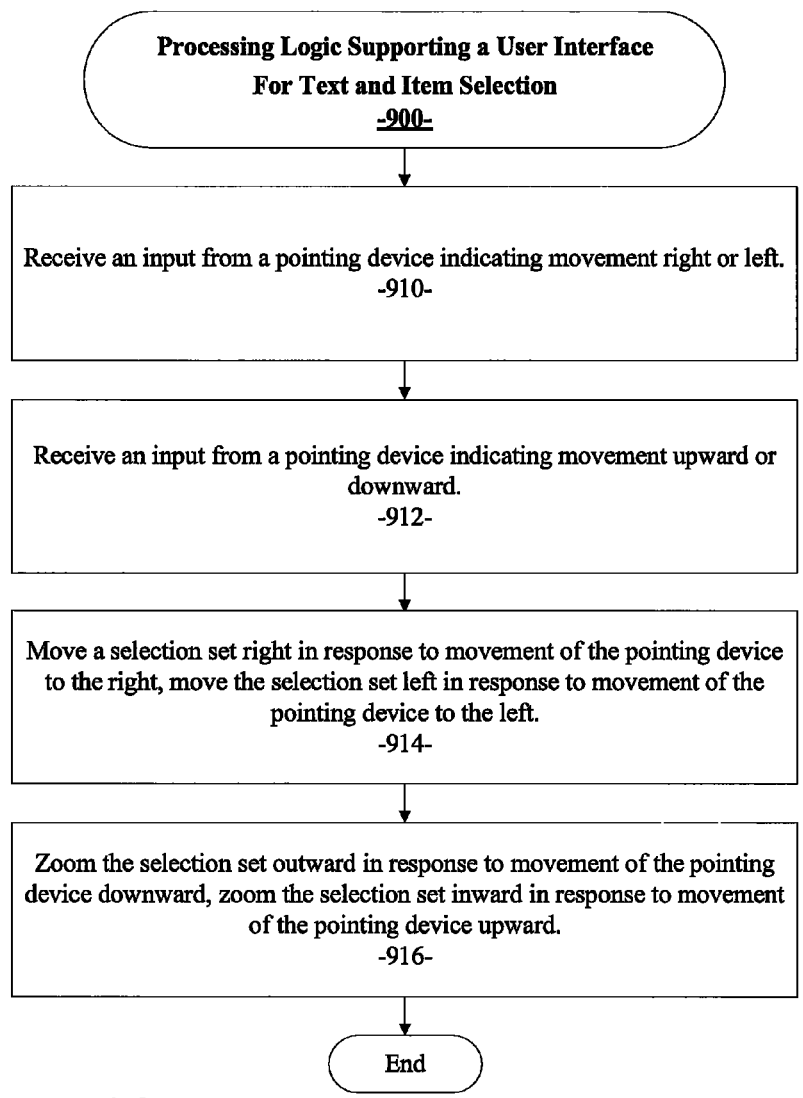
FIGS. 12 and 13 illustrate processing flow diagrams for example embodiments.

Referring to FIG. 12, a processing flow 900 for generating a user interface in an example embodiment is shown. The method of an example embodiment 900 includes: receiving an input from a pointing device indicating movement right or left (processing block 910); receiving an input from a pointing device indicating movement upward or downward (processing block 912); moving a selection set to the right in response to movement of the pointing device to the right and moving the selection set to the left in response to movement of the pointing device to the left (processing block 914); and zooming a selection set outward in response to movement of the pointing device downward, and zooming the selection set inward in response to movement of the pointing device upward (processing block 916).

Figure 13:
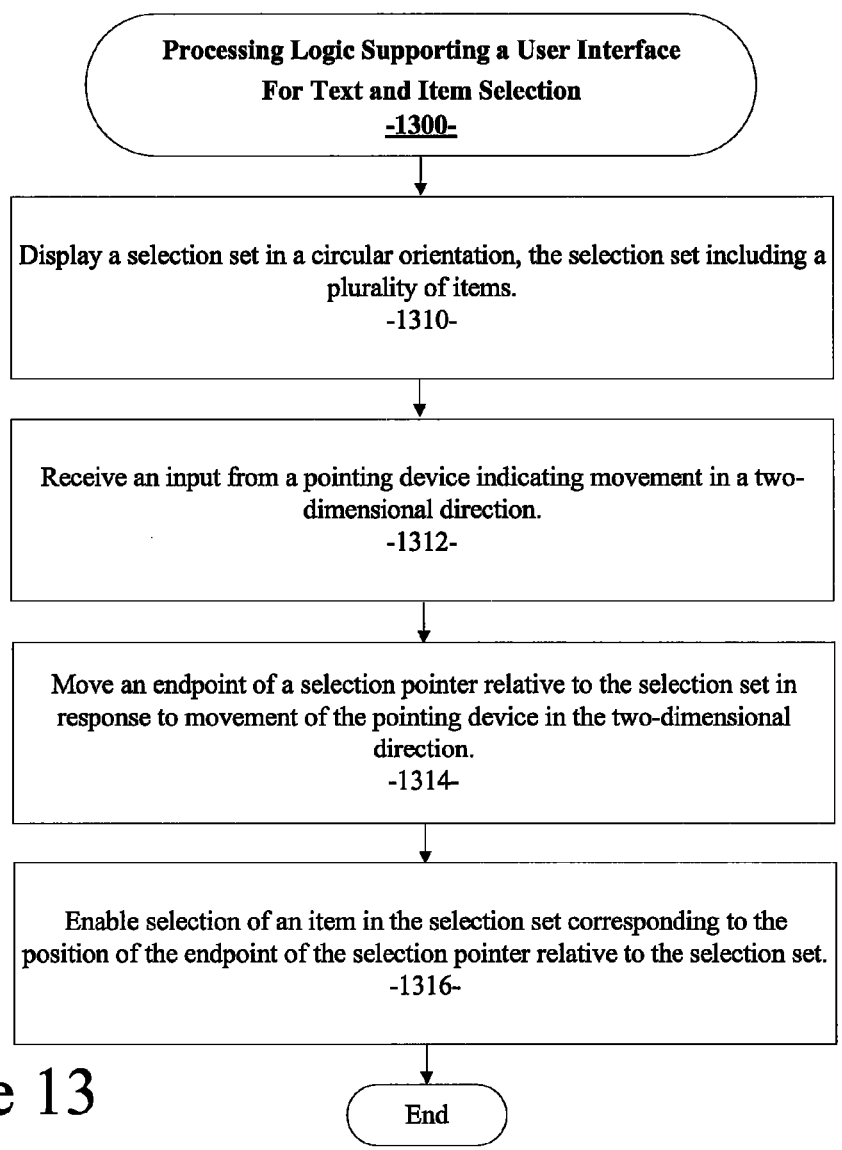

Referring to FIG. 13, a processing flow 1300 for generating a user interface in another example embodiment is shown. The method of an example embodiment 1300 includes: displaying a selection set in a circular orientation, the selection set including a plurality of items (processing block 1310); receiving an input from a pointing device indicating movement in a two-dimensional direction (processing block 1312); moving an endpoint of a selection pointer relative to the selection set in response to movement of the pointing device in the two-dimensional direction (processing block 1314); and enabling selection of an item in the selection set corresponding to the position of the endpoint of the selection pointer relative to the selection set (processing block 1316).

Modules, Components and Logic

Certain embodiments are described herein as including logic or a number of components, modules, or mechanisms. A component can be a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 14:
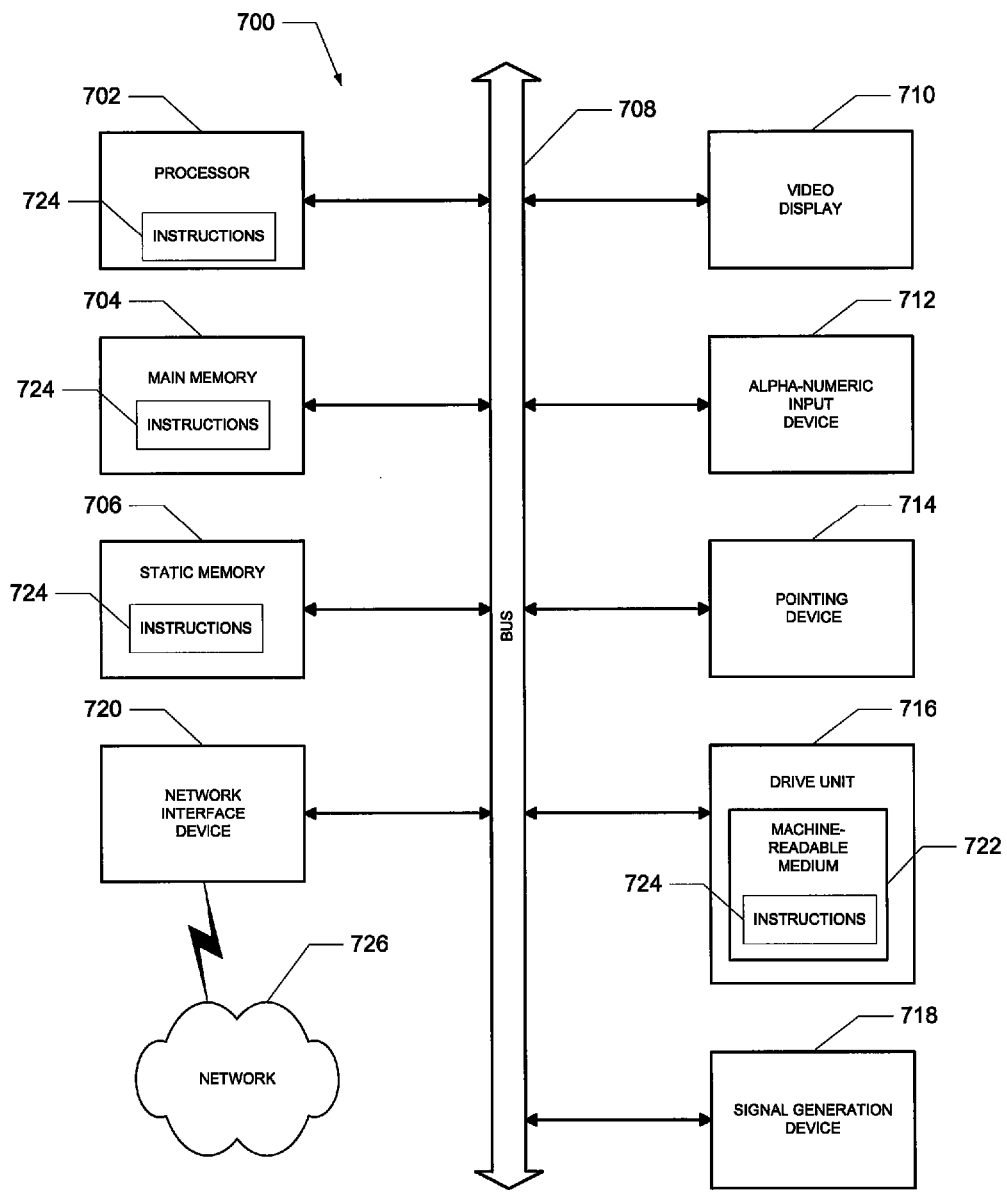
FIG. 14 is a block diagram of machine in the example form of a computer system within which instructions, for causing the machine to perform any one or more of the methodologies discussed herein, may be executed.

FIG. 14 is a block diagram of machine in the example form of a computer system 700 within which instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 may also include an alphanumeric input device 712 (e.g., a keyboard), a user interface (UI) pointing device 714 (e.g., pointing device, thumbstick device, mouse, TV remote device, a game controller device, spatial movement detection devices, such as the Wii system sold by Nintendo of America, Inc., or any other hardware or software device/system, which can signal movement in a two-dimensional space, herein a pointing device), a disk drive unit 716, a signal generation device 718 (e.g., a hardware button or softkey located anywhere on a remote device, a gesture detection device, audible command detection device, or the like) and a network interface device 720.

Machine-Readable Medium

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 724 may further be transmitted or received over a communications network 726 using a transmission medium. The software 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    displaying a selection set in a linear orientation laterally on a display, the selection set including a plurality of selectable items;
    displaying a stationary selection marker on the display;
    receiving an input from a single pointing device, the input indicating movement right, left, upward, or downward;
    moving the selection set right relative to the stationary selection marker in response to movement of the single pointing device to the right, and moving the selection set left relative to the stationary selection marker in response to movement of the single pointing device to the left;
    zooming the selection set outward in response to the movement of the single pointing device downward, and zooming the selection set inward in response to the movement of the single pointing device upward, an amount of the zooming inward or outward of the selection set determined based on a combination of an amount of deflection and length of time of the deflection of the single pointing device that is also used to move the selection set to the right and left, zooming of the selection set outward causing reduced spacing between the plurality of items and quicker movement of the selection set left and right after the zooming of the selection set outward, and the zooming of the selection set inward causing increased spacing between the plurality of items and more accurate movement of the selection set left and right after zooming the selection set inward;
    displaying a copy of one of the selectable items of the selection set based on the one of the selectable items being positioned in proximity to the selection marker;
    receiving a selection input to select the one of the selectable items of the selection set that is located at the stationary selection marker; and
    performing an action corresponding to the one of the selectable items based on the selection of the one of the selectable items.

2. The method as claimed in claim 1 wherein the selection set comprises letters of an alphabet.

3. The method as claimed in claim 1 wherein the selection set comprises representations of physical or logical entities.

4. The method of claim 1, wherein a first speed at which the selection set is moved to the right is controlled by a degree of deflection of the single pointing device to the right, and a second speed at which the selection set is moved to the left is controlled by a degree of deflection of the single pointing device to the left.

5. An apparatus comprising:
    a pointing device interface;
    a memory comprising instructions for execution by one or more processors; and
    one or more processors, coupled to the memory, the one or more processors being operable when executing the instructions to:
        display a selection set in a linear orientation laterally on a display, the selection set including a plurality of selectable items,
        display a stationary selection marker on the display,
        receive an input from a single pointing device via the pointing device interface, the input indicating movement right, left, upward, or downward,
        move the selection set to the right relative to the stationary selection marker in response to the movement of the single pointing device to the right, to move the selection set relative to the stationary selection marker to the left in response to the movement of the single pointing device to the left,
        zoom the selection set outward in response to the movement of the single pointing device downward, and
        zoom the selection set inward in response to the movement of the single pointing device upward, an amount of the zooming of the selection set inward or outward determined based on a combination of an amount of deflection and length of time of the deflection of the single pointing device that is also used to move the selection set to the right and left;

reduce spacing between the plurality of items and move the selection set left and right more quickly based on the zooming of the selection set outward;

increase spacing between the plurality of items and move the selection set left and right more accurately based on the zooming of the selection set inward;

display a copy of one of the selectable items of the selection set based on the one of the selectable items being positioned in proximity to the selection marker;

receive a selection input to select the one of the selectable items of the selection set that is located at the stationary selection marker; and performing an action corresponding to the one of the selectable items based on the selection of the one of the selectable items.

6. The apparatus as claimed in claim 5 being further configured to save a copy of a selected item in an item string created and saved in a separate display area.

7. The apparatus as claimed in claim 5 wherein the selection comprises letters of an alphabet.

8. The apparatus as claimed in claim 5 wherein the selection set comprises representations of physical or logical entities.

9. The apparatus of claim 5, wherein a first speed at which the selection set is moved to the right is controlled by a degree of deflection of the single pointing device to the right, and a second speed at which the selection set is moved to the left is controlled by a degree of deflection of the single pointing device to the left.

10. An article of manufacture comprising a non-transitory machine-readable storage medium having machine executable instructions embedded thereon, which when executed by a machine, cause the machine to perform operations comprising:

displaying a selection set in a linear orientation laterally on a display, the selection set including a plurality of selectable items;

displaying a stationary selection marker on the display;

receiving an input from a single pointing device, the input indicating movement right, left upward, or downward;

moving the selection set to the right relative to the stationary selection marker in response to movement of the single pointing device to the right, and moving the selection set to the left relative to the stationary selection marker in response to movement of the single pointing device to the left; and zooming the selection set outward in response to the movement of the single pointing device downward, and zooming the selection set inward in response to the movement of the single pointing device upward, an amount of the zooming inward or outward of the selection set determined based on a combination of an amount of deflection and length of time of the deflection of the single point device that is also used to move the selection set to the right and left, the zooming of the selection set outward causing reduced spacing between the plurality of items and quicker movement of the selection set left and right after the zooming of the selection set outward, and the zooming of the selection set inward causing increased spacing between the plurality of items and more accurate movement of the selection set left and right after zooming the selection set inward;

displaying a copy of one of the selectable items of the selection set based on the one of the selectable items being positioned in proximity to the selection marker;

receiving a selection input to select the one of the selectable items of the selection set that is located at the stationary selection marker; and performing an action corresponding to the one of the selectable items based on the selection of the one of the selectable items.

11. The article of manufacture of claim 10, wherein a first speed at which the selection set is moved to the right is controlled by a degree of deflection of the single pointing device to the right, and a second speed at which the selection set is moved to the left is controlled by a degree of deflection of the single pointing device to the left.

12. A method comprising:

displaying a stationary selection set in a circular orientation, the stationary selection set including a plurality of items;

receiving an input from a single pointing device, the input indicating a deflection movement of the single pointing device in a two-dimensional direction;

in response to receiving the input, moving an endpoint of a selection pointer to indicate one of the plurality of items in the stationary selection set, wherein the moving of the endpoint automatically varies in speed based on a first location of the endpoint relative to a second location near a center of the stationary selection set in the circular orientation, the moving of the endpoint becoming slower as the endpoint moves from the second location near the center of the stationary selection set in the circular orientation towards the one of the plurality of items in the stationary selection set, and as a distance of the endpoint from the second location near the center of the stationary selection set the circular orientation increases;

receiving a selection of the one of the plurality of items in the stationary selection set; and in response to receiving of the selection of the one of the plurality of items in the stationary selection set, saving a copy of the one of the plurality of items of the stationary selection set in an item string created and saved in a display area.

13. An apparatus comprising:

a pointing device interface;

a memory comprising instructions for execution by one or more processors; and one or more processors, coupled to the memory, the one or more processors being operable when executing the instructions to:

display a stationary selection set in a circular orientation, the stationary selection set including a plurality of items, receive an input from a single pointing device, the input indicating a deflection movement of the single pointing device in a two-dimensional direction, in response to receiving the input, move an endpoint of a selection pointer to indicate one of items in the stationary selection set, wherein the moving of the endpoint automatically varies in speed based on a first location of the endpoint relative to a second location near a center of the stationary selection set in the circular orientation, the moving of the endpoint becoming slower as the endpoint moves from the second location near the center of the stationary selection set in the circular orientation towards the one of the plurality of items in the stationary selection set, and as a distance of the endpoint from the second location near the center of the stationary selection set in the circular orientation increases, receive a selection of the one of the plurality of items in the stationary selection set; and in response to receiving the selection of the one of the plurality of items in the stationary selection set, save a copy of a selected item of the selection set in an item string created and saved in a display area.

\* \* \* \* \*

UNITED STATES PATENT AND TRADEMARK OFFICE
CERTIFICATE OF CORRECTION

PATENT NO. : 9,195,317 B2
APPLICATION NO. : 12/366293
DATED : November 24, 2015
INVENTOR(S) : Nicholas D. Doerring Page 1 of 1

It is certified that error appears in the above-identified patent and that said Letters Patent is hereby corrected as shown below:

In the Claims

In column 18, line 32, in Claim 12, after "set", insert --in--, therefor

In column 18, line 55, in Claim 13, before "items", insert --the plurality of--, therefor Signed and Sealed this
Twenty-eighth Day of June, 2016

Michelle K. Lee
*Director of the United States Patent and Trademark Office*